US007297961B2

(12) United States Patent
Kang et al.

(10) Patent No.: US 7,297,961 B2
(45) Date of Patent: Nov. 20, 2007

(54) FLUORESCENCE MICROSCOPE AND OBSERVATION METHOD USING THE SAME

(75) Inventors: Uk Kang, Gunpo-si (KR); Garry V. Papayan, St. Petersburg (RU)

(73) Assignee: Korea Electrotechnology Research Institute, Gyeongsangnam-do (KR)

( * ) Notice: Subject to any disclaimer, the term of this patent is extended or adjusted under 35 U.S.C. 154(b) by 1 day.

(21) Appl. No.: 10/975,707

(22) Filed: Oct. 28, 2004

(65) Prior Publication Data

US 2005/0092934 A1 May 5, 2005

(30) Foreign Application Priority Data

Oct. 29, 2003 (KR) ............... 10-2003-0075916

(51) Int. Cl.
*F21V 9/16* (2006.01)
*F21K 2/00* (2006.01)
*G01C 19/66* (2006.01)
*G01J 1/00* (2006.01)
*G01N 21/41* (2006.01)

(52) U.S. Cl. ............... 250/458.1; 356/417; 356/213; 356/135; 250/462.1

(58) Field of Classification Search ........... 250/461.2, 250/484.2, 201.3, 216, 203.3, 306, 307, 483.1, 250/484.4, 458.1, 462.1; 356/417, 213, 135
See application file for complete search history.

(56) References Cited

U.S. PATENT DOCUMENTS

| | | | | |
|---|---|---|---|---|
| 4,621,911 A | * | 11/1986 | Lanni et al. ............... | 359/386 |
| 5,633,724 A | * | 5/1997 | King et al. ............... | 356/445 |
| 6,201,989 B1 | * | 3/2001 | Whitehead et al. ......... | 600/476 |
| 6,255,083 B1 | | 7/2001 | Williams | |
| 2002/0097489 A1 | * | 7/2002 | Kawano et al. .......... | 359/388 |
| 2003/0157538 A1 | * | 8/2003 | Krull et al. ............... | 435/6 |

OTHER PUBLICATIONS

Abramowitz, et al. "Refraction of Light". Molecular Expressions: Science, Optics, and You: Light and Color—Refraction of Light. Last Modified Aug. 1, 2003. http://www.olympusmicro.com/primer/lightandcolor/refraction.html.*
Applied Precision, LLC., "*arrayWoRx®e* 4-Color Biochip Reader" brochure, 2004.

* cited by examiner

*Primary Examiner*—Georgia Epps
*Assistant Examiner*—Bui-Pho M. Pascal
(74) *Attorney, Agent, or Firm*—The Webb Law Firm

(57) ABSTRACT

The present invention relates, in general, to a fluorescence microscope and method of observing samples using the microscope and, more particularly, to a fluorescence microscope and method of observing samples using the microscope, which can reduce optical noise and obtain images with higher sensitivity, thus obtaining precise information about the density, quantity, location, etc. of a fluorophore, and which can simultaneously process separate images even when a plurality of fluorophores having different excitation and fluorescent wavelength ranges is distributed, thus easily obtaining information about the fluorophores. The fluorescence microscope of the present invention includes an objective lens, and first and third medium units. The first medium unit has a refractive index of $n_1$ to accommodate one or more micro-objects including fluorophores and provide a path of excitation light to excite the fluorophores. The third medium unit has a refractive index of $n_3$, and is placed between the first medium unit and the objective lens to totally reflect the excitation light incident through the first medium unit at an interface of the third medium unit coming into contact with the first medium unit. The refractive indices of the third and first medium units satisfy a relationship of $n_1 > n_3$.

4 Claims, 11 Drawing Sheets

(PRIOR ART)

(PRIOR ART)

(PRIOR ART)

(PRIOR ART)

(PRIOR ART)

(PRIOR ART)

(a)            (b)

(a)            (b)

FLUORESCENCE MICROSCOPE AND OBSERVATION METHOD USING THE SAME

BACKGROUND OF THE INVENTION

1. Field of the Invention

The present invention relates, in general, to a fluorescence microscope and method of observing samples using the microscope and, more particularly, to a fluorescence microscope and method of observing samples using the microscope, which can reduce optical noise and obtain images with higher sensitivity, thus obtaining precise information about the density, quantity, location, etc. of a fluorophore, and which can simultaneously process separate images even when a plurality of fluorophores having different excitation and fluorescent wavelength ranges is distributed, thus easily obtaining information about the fluorophores.

The present invention relates, in general, to a fluorescence microscope, which is an optical instrument, and more particularly, to technology used to observe micro-samples in detail using fluorescence in a variety of biomedical fields, including the fluorescence analysis of a biochip, such as a DNA microarray. A fluorescence microscope is a device for irradiating light onto a micro-object, executing an excitation and fluorescence emission process on the micro-object using the irradiated light, capturing emitted fluorescence, and observing information, such as the image of the micro-object.

2. Description of the Related Art

As shown in FIG. 1, a conventional fluorescence microscope separates the paths of excitation light 12 and fluorescent emission 13 using a beam splitter that is implemented with a combination of an excitation filter 10 installed in front of a light source 5, shielding filters and a dichroic mirror 15. Since an interference coating film on the surface of the dichroic mirror 15 has characteristics of efficiently reflecting the excitation light 12 and allowing the fluorescence emission 13 having a longer wavelength to efficiently pass therethrough, the excitation light 12 cannot be efficiently transferred in the direction of a Charge Coupled Device (CCD) camera 40, and the fluorescent emission 13, emitted from a micro-object existing in a sample 25, is mainly transferred in the direction of the CCD camera 40. Since such a light irradiation scheme uses fluorescence having a unique wavelength emitted from the micro-object, the light irradiation scheme can obtain an image having improved contrast compared to a conventional scheme of principally irradiating light onto an object through a condenser of a microscope and observing light scattered from the object, and has been widely used in typical fluorescence microscopes.

However, as shown in FIG. 1, a portion where the paths of the excitation light 12 and the fluorescence emission 13 are spatially identical to each other exists in front of and behind an objective lens 20, so that optical noise 55, 50 and 45 is caused due to the autofluorescence generated by optical components of the objective lens 20, and the formation of hot spots caused by scattering sources or fluorescence generation sources existing inside and on the objective lens 20. These optical noises decrease the contrast of a formed fluorescence image, and causes difficulty in the precise registration of weak fluorescence, generated due to a small amount of fluorophore present in the micro-object to be observed.

Further, as in the case of the conventional fluorescence microscope, in the construction employing a component (for example, the above-described dichroic mirror) 15 for selecting an optical spectrum on the light path so that the excitation light 12 and the fluorescence emission 13 pass through the same path in front of and behind the objective lens 20 and, in that state, the excitation light 12 is prevented from reaching the observation unit 40, such as a CCD camera, it is basically impossible to simultaneously perform observation, such as the comparison of samples colored with polychromatic dyes, on a single screen.

In order to solve this problem, as shown in FIG. 2, a scheme of preventing the excitation light 12 from passing through the objective lens 20 and separating the spatial paths of the excitation light 12 and the fluorescence emission 13 has been proposed (for example, the biochip reader "Array WoRx" by Applied Precision of U.S. that employs a scheme of combining a light source 5 and an optical fiber 60 to irradiate light onto an analysis object). As shown in FIG. 2, such a scheme irradiates light onto an object at an angle oblique to an optical axis direction of the objective lens 20, thus preventing the excitation light 12 from passing through the objective lens 20 and reducing the amount of optical noise. However, in this scheme, a considerable available space S is required between the objective lens 20 and the object 25, which causes the use of an objective lens 20 having a high numerical aperture to be difficult. Moreover, there is a problem in that light scattered from the object 25 (including dust) and several surfaces of the microscope is incident on the objective lens 20, so that it is difficult to prevent the occurrence of optical noise.

FIG. 3 illustrates Total Internal Reflection Fluorescence Microscopy (TIRFM), which irradiates excitation light 140 using total internal reflection. In this method, the paths of the excitation light 140 and fluorescence emission are separated using total reflection occurring when an incident angle exceeds a critical angle at the interface between two media. Further, an evanescent wave generated from a medium having low optical density is used for the fluorescence excitation of micro-objects 110 arranged around an interface.

In this construction, as shown in FIG. 3, observation objects are placed on a medium having a refractive index of $n_1$. The fluorescence microscope is not different from the above-described fluorescence microscope in that the observation objects 110 include fluorophores and the fluorophores emit fluorescence due to the behavior of excitation light. The emitted light passes through a second medium and is directed to the interface between the first and second media at an incident angle of $\theta$. It is well known that, if the reflective indices of the second and first media satisfy a relationship of $n_2 > n_1$, and the incident angle of the light satisfies a relationship of $\theta > \theta_c = \sin^{-1}(n_1/n_2)$ (where $\theta_c$ is a critical incident angle), Total Internal Reflection (TIR) occurs at the interface between the first and second media. The light reflected from the interface completely returns to the second medium.

A slight part of electromagnetic radiation incident on the interface between the two media passes through the interface, so that the intensity thereof exponentially attenuates in the z axis direction of FIG. 3 and the slight part is extinguished and cannot be propagated into the first medium. Therefore, the propagation of the evanescent wave, the intensity of which decreases exponentially, occurs in an extremely small region 130 around the interface of the first medium. If the interface of the first medium is expressed by z=0, the intensity of the evanescent wave obtained in the z axis direction is given by the following equation.

$$I(z) = I_0 e^{-z/d}, \text{ where } d = (\lambda_0/4\pi)(n_2^2 \sin\theta - n_1^2)^{-1/2}$$

The evanescent wave can function to excite the fluorophores present in the micro-objects 120 existing around the interface, and the penetration depth of the evanescent wave into the first medium generally does not exceed several hundred nanometers. Therefore, this method is suitable for the observation of micro-objects existing in a thin region 130 around the interface. However, since the intensity of the evanescent wave is low as described above, there is a problem in that the sensitivity of detected light is excessively low, and only micro-objects existing around the interface are consistently observed. Accordingly, this method is problematic in that it is not suitable for the observation of micro-objects distributed within a region having a relatively high volume.

Such Total Internal Reflection Fluorescence Microscopy (TIRFM) is implemented with the following two structures: a structure (1) in which light is provided from the arrangement direction of an objective lens to the direction of the interface, and a structure (2) in which light is provided from a direction opposite to the objective lens to the direction of the interface.

The above structure (1) is disclosed in U.S. Patent Application Publication No. 2002-97489, and depicted in FIG. 4. Such a structure is designated as an inverted microscope, in which the rearmost lens 151 of objective lenses, a sample 145, a cover glass 147 and immersion oil 149 are shown in FIG. 4. The rearmost lens 151 of the objective lenses is adjacent to the immersion oil 149 having a refractive index of $n_1$.

The sample 145 having a refractive index of $n_2$ is placed on the cover glass 147. Excitation light 140 is incident from a light source (illuminator), passes through the immersion oil 149 and is totally reflected from the interface between the cover glass 147 and the sample 145 through the cover glass 147. The refractive index of the cover glass 147 is almost equal to that of the immersion oil 149. An evanescent wave is generated from the surface of the cover glass 147, and fluorescence is emitted from the molecules of the sample adjacent to the cover glass 147. The emitted fluorescence is focused onto an image processing unit after passing through a dichromatic filter (not shown) and an emission filter (not shown) that are arranged below the objective lens 151.

However, the above-described fluorescence observation system includes the immersion oil 149, and requires the very complicated objective lens 151 having a high numerical aperture. Further, since the above fluorescence observation system requires components such as a color filter for selecting an optical spectrum, it is impossible to perform an operation of simultaneously processing separate florescent images using color images and obtaining information about the separate images in the case where a plurality of fluorophores having different excitation and fluorescence wavelength ranges are distributed. Further, since the irradiation of excitation light and the collection of fluorescence emission are performed by the same objective lens 151, optical noise is caused due to the autofluorescence generated by the components of the objective lens 151, and the hot spots caused by scattering sources, etc. distributed inside and on the objective lens 151, thus deteriorating the sensitivity of a microscope.

The above structure (2) is disclosed in U.S. Pat. No. 6,255,083, and depicted in FIG. 5. The microscope uses a gas laser having a tunable wavelength as a light source 201, which allows laser light to pass through a laser line filter 210 so as to filter excitation light only. Thereafter, the laser light is incident on a fused-silica right angle prism 202 placed just below a cover slip 203. Molecules, which are samples to be observed, are immersed in a buffer solution 204 placed on the cover slip 203.

Referring to FIGS. 5 and 6, laser light 240 incident on the prism 202 is refracted and incident at an angle greater than a critical angle between the fused-silica right angle prism 202 and the buffer solution 204. Therefore, the laser light is totally internally reflected (TIR) by the prism 202, and an evanescent wave is generated in a region adjacent to the interface of the buffer solution 204. Fluorescence emissions 255 from the samples 110 are collected by an objective lens 205 immersed in the buffer solution 204, and an image of an object is projected onto a camera 208 by a multi-wavelength viewer 207 for partially separating an image according to wavelength.

The above-described two types of fluorescence microscopes using total internal reflection employ a scheme of exciting observation objects existing within a range of about a monolayer using an evanescent wave, and utilizing fluorescence emission emitted from the observation objects, and are suitable for the observation of micro-areas, thus providing an excellent means for the research of cellular and molecular biology. However, there are problems in that, since the intensity of the evanescent wave is low as described above, the sensitivity of detected light is excessively low, and only micro-objects existing around an interface are consistently observed. Accordingly, the above microscopes have a problem in that they are not suitable for the observation of micro-objects distributed within a region having a relatively high volume.

In addition, the conventional apparatuses for observing micro-objects, such as biochips, have a further problem in that various optical noises must be eliminated and optical filters corresponding to several types of fluorescent dyes having different fluorescence emission wavelengths must be used, thus complicating the observation apparatuses, and unnecessarily increasing the size thereof.

SUMMARY OF THE INVENTION

Accordingly, the present invention has been made keeping in mind the above problems occurring in the prior art, and an object of the present invention is to provide a fluorescence microscope and method of observing samples using the microscope, which can reduce optical noise and obtain more highly sensitive images, thus obtaining precise information about the density, quantity, location, etc. of a fluorophore, and which can simultaneously process separate images even when a plurality of fluorophores having different excitation and fluorescent wavelength ranges is distributed, thus easily obtaining pieces of information about the fluorophores.

Another object of the present invention is to provide a biochip observation apparatus, which is constructed to be able to observe a small amount of fluorescent dye due to the reduction of the occurrence of optical noises and to simultaneously observe fluorescence images emitted from various fluorescent dyes without using optical filters, in order to solve another disadvantage of conventional apparatuses for observing micro-objects such as biochips in that, as various optical noises must be eliminated and various types of optical filters must be used, observation apparatuses become complicated and the size thereof increases.

A further object of the present invention is to provide a fluorescence microscope, which is constructed to excite micro-objects distributed within a region having a relatively high volume in addition to a monolayer, thus acquiring a fluorescence image with high sensitivity from the excited micro-objects, unlike the above-described conventional fluorescence microscopes using an evanescent wave.

Therefore, unlike the conventional TIRFM scheme, the present invention uses fluorescence obtained due to the excitation of micro-objects occurring over the entire thickness of a sample, not a region in which an evanescent field extends. The present inventor designates the excitation scheme of the present invention as a "space excitation TIRFM", or "TIRFM-SE".

In accordance with one aspect of the present invention, there is provided a fluorescence microscope, comprising an objective lens; a first medium unit with a refractive index of $n_1$ for accommodating one or more micro-objects including fluorophores and providing a path of excitation light to excite the fluorophores; and a third medium unit with a refractive index of $n_3$ placed between the first medium unit and the objective lens to totally reflect the excitation light incident through the first medium unit at an interface of the third medium unit coming into contact with the first medium unit.

In this case, the refractive indices of the third and first medium units satisfy a relationship of $n_1 > n_3$, an incident angle of the excitation light on the interface may be equal to or greater than a critical angle, and fluorescence, emitted when fluorophores present in micro-objects that exist in the path of the excitation light within the first medium unit are excited, is captured by the objective lens, thus observing the micro-objects.

Further, in accordance with another aspect of the present invention, there is provided a fluorescence microscope, comprising an objective lens; a first medium unit with a refractive index of $n_1$ for accommodating one or more micro-objects including fluorophores and providing a path of excitation light to excite the fluorophores; a fourth medium unit with a refractive index of $n_4$ for covering a surface facing the objective lens among surfaces of the first medium unit; and a third medium unit with a refractive index of $n_3$ placed between the fourth medium unit and the objective lens to totally reflect the excitation light incident through the first and fourth medium units at an interface of the third medium unit coming into contact with the fourth medium unit.

In this case, the refractive indices of the first, third and fourth medium units satisfy a relationship of $n_1 \approx n_4 > n_3$, an incident angle of the excitation light on the interface between the fourth and third medium units may be equal to or greater than a critical angle, and fluorescence, emitted when fluorophores present in micro-objects that exist in the path of the excitation light within the first medium unit are excited, is captured by the objective lens, thus observing the micro-objects.

Preferably, the fluorescence microscope may further comprise an optical coupling fluid layer for optically coupling the fourth and first medium units to each other as a fifth medium unit, the fourth medium unit being a cover glass, wherein the fifth medium unit may have a refractive index of $n_5$, and satisfies a relationship of $n_5 \approx n_4 \approx n_1$.

Preferably, the fluorescence microscope may further comprise an image processing unit for providing images of objects obtained due to fluorescence collected by the objective lens as images; a prism including at least an incident surface, a contact surface and an output surface; a light source for providing excitation light to the incident surface of the prism; and an optical coupling unit formed on the contact surface of the prism so as to allow a sample including one or more micro-objects having fluorophores to be seated thereon.

Preferably, the fluorescence microscope may further comprise an absorber installed on the output surface of the prism to absorb the excitation light that has been totally reflected.

Preferably, the optical coupling unit may be made of an elastic material to facilitate optical contact with the seated sample.

Further, in accordance with a further aspect of the present invention, there is provided an observation method using a fluorescence microscope, comprising the steps of allowing excitation light, required to excite fluorophores, to pass through a medium accommodating one or more micro-objects including fluorophores; totally reflecting the excitation light to prevent the excitation light from reaching an objective lens; and allowing the totally reflected excitation light to pass again through the medium accommodating one or more micro-objects, wherein fluorescence, emitted when fluorophores present in micro-objects that exist in the path of the excitation light within the first medium unit are excited, is captured by the objective lens, thus observing the micro-objects.

The fluorescence microscope of the present invention is constructed to separate the paths of excitation light and fluorescence emission by exploiting an excitation scheme using total internal reflection (total reflection) so as to observe the fluorescence of a micro sample, such as a biochip, and constructed to irradiate the excitation light from a side opposite to an objective lens and an optical processing unit around a sample, thus efficiently blocking unnecessary fluorescence and scattering occurring on the objective lens, etc. due to the irradiation of excitation light, reducing a required work space between the objective lens and the sample. The fluorescence microscope of the present invention is constructed to allow only fluorescence emission to reach an observation unit, such as an optical processing unit, so that an excitation light blocking filter, a shielding filter, etc. are unnecessary, thus greatly simplifying the apparatus and realizing high sensitivity.

Further, the fluorescence microscope of the present invention is constructed to utilize the above-described space excitation scheme, so that the sensitivity of a small amount of fluorescence generated from micro-objects, such as biochips, can greatly increase, and constructed not to utilize optical filters, so that polychromatic fluorescent dyes can be simultaneously observed on a single screen, thus further simplifying observation equipment and increasing observation efficiency.

DESCRIPTION OF THE PREFERRED EMBODIMENTS

Figure 1:
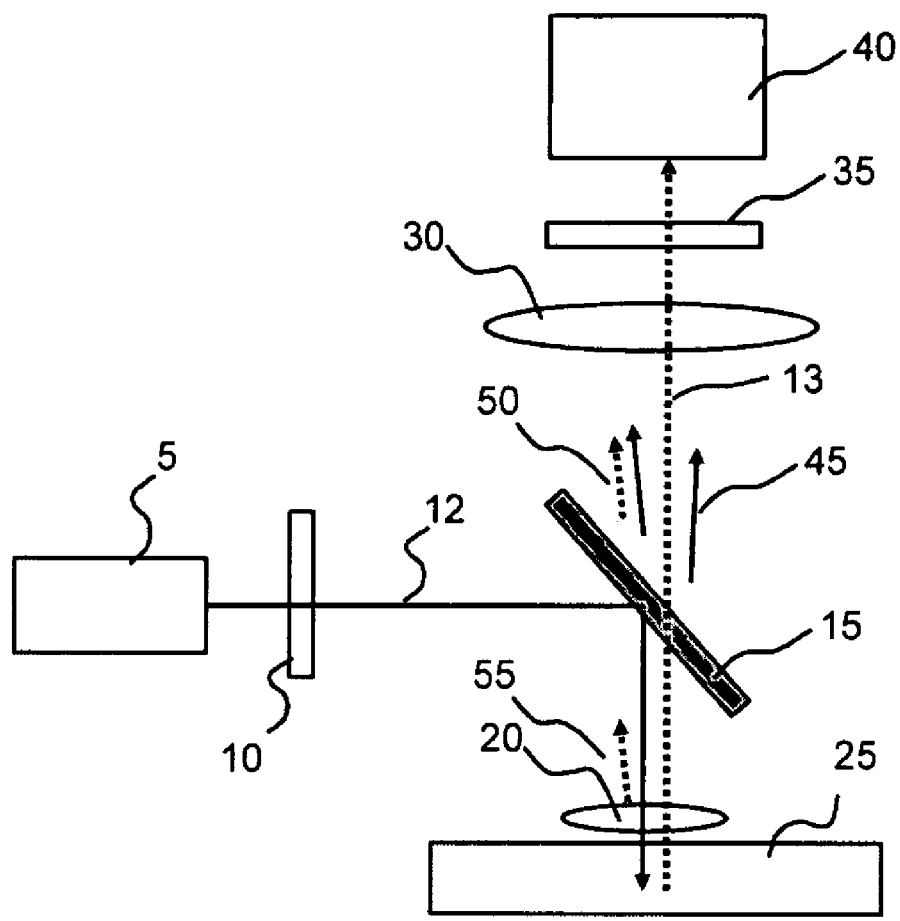
FIG. 1 illustrates an example of a conventional fluorescence microscope.
Figure 2:
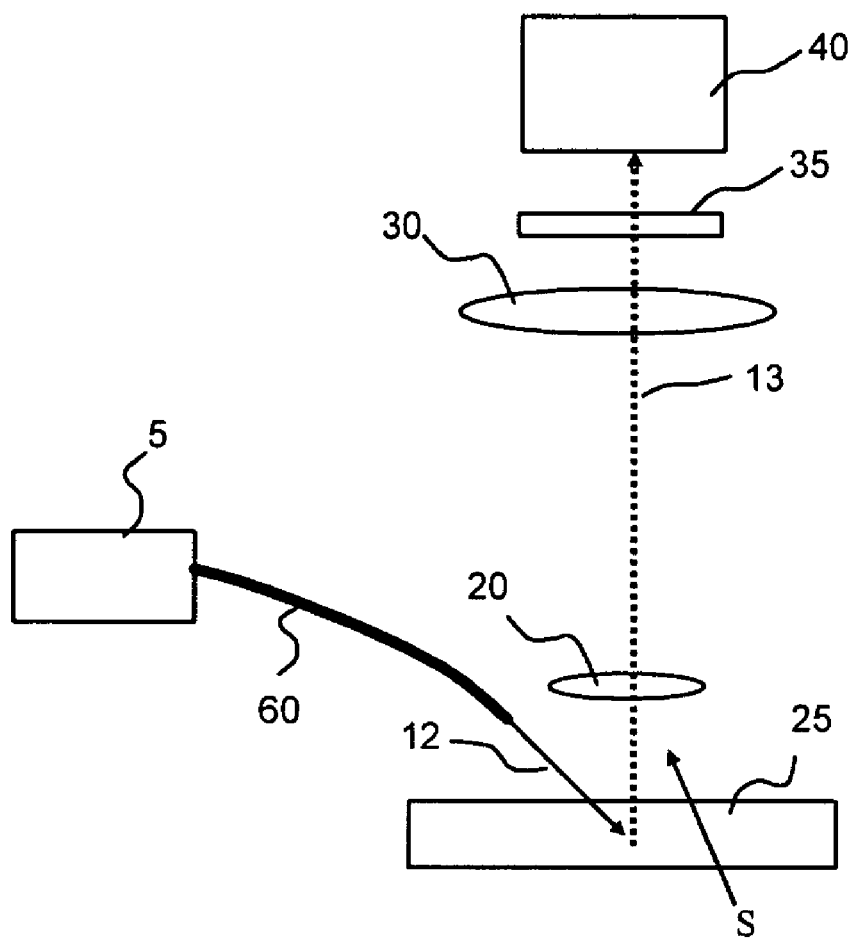
FIG. 2 illustrates another example of a conventional fluorescence microscope, in which the paths of excitation light and fluorescence emission are separated.
Figure 3:
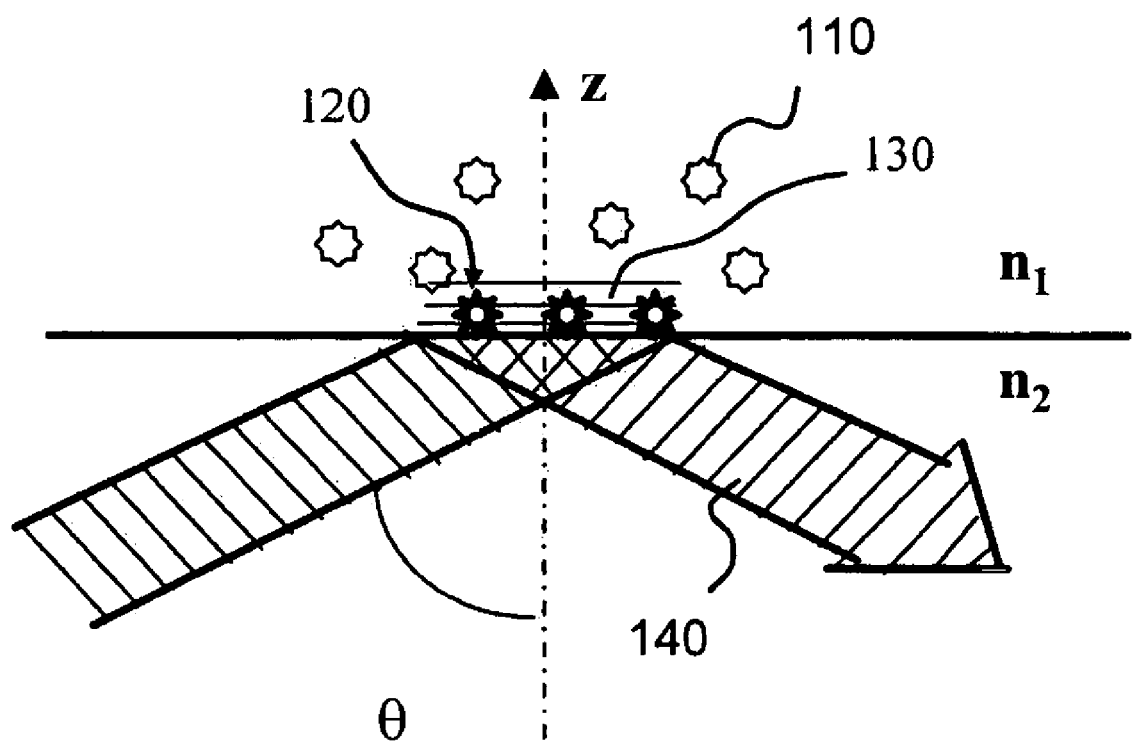
FIG. 3 illustrates a further example of a conventional fluorescence microscope, in which the operating principles of TIRFM are shown.
Figure 4:
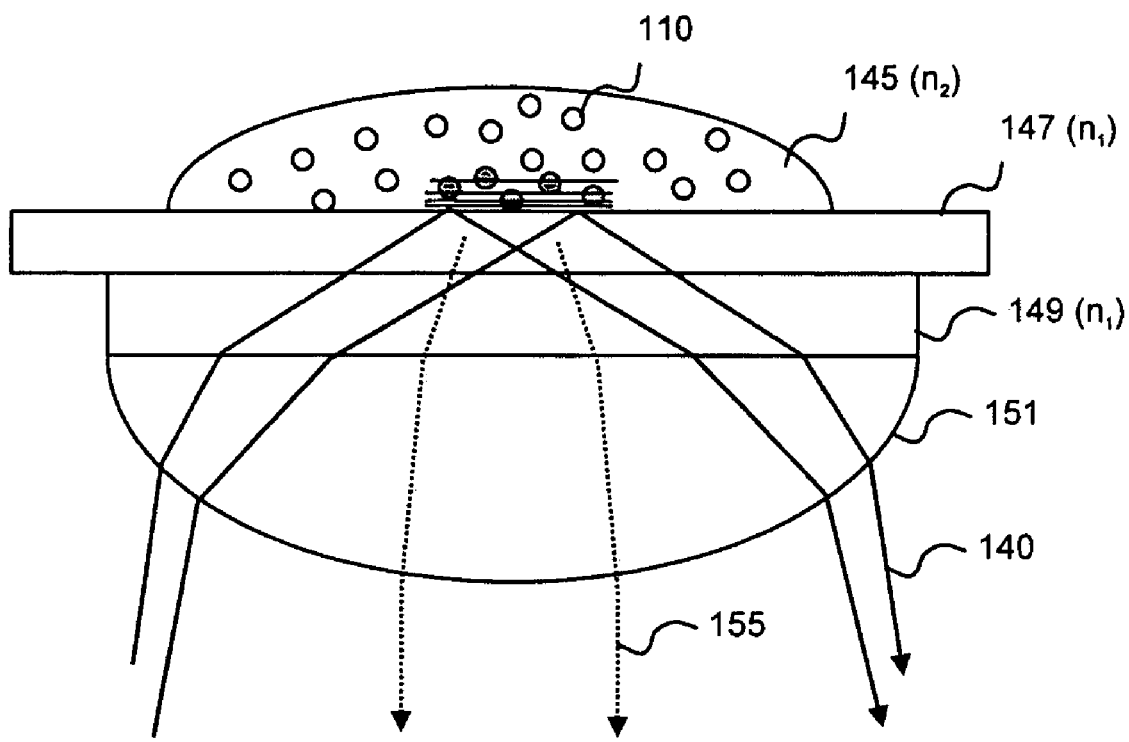
FIG. 4 illustrates an example of a conventional fluorescence microscope using total internal reflection, in which the construction of an inverted microscope is shown.
Figure 5:
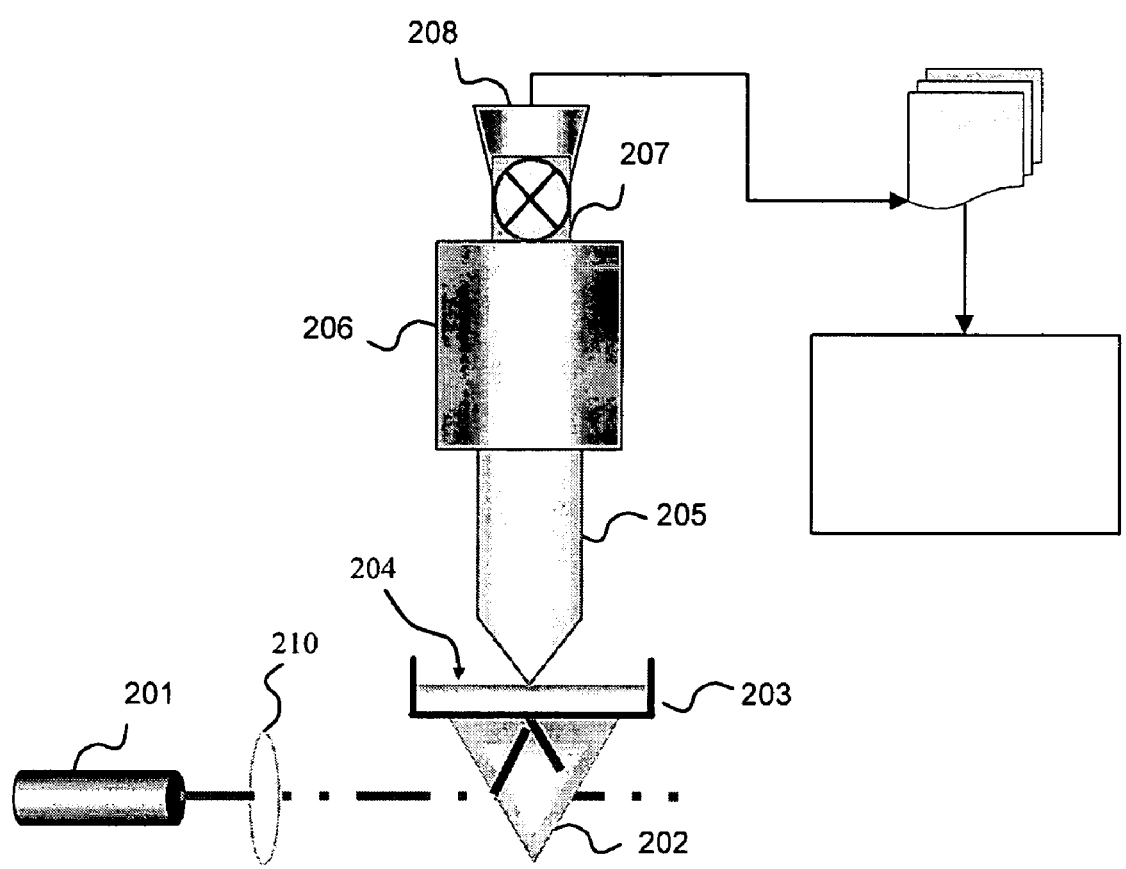
FIG. 5 illustrates another example of a conventional fluorescence microscope using total internal reflection.
Figure 6:
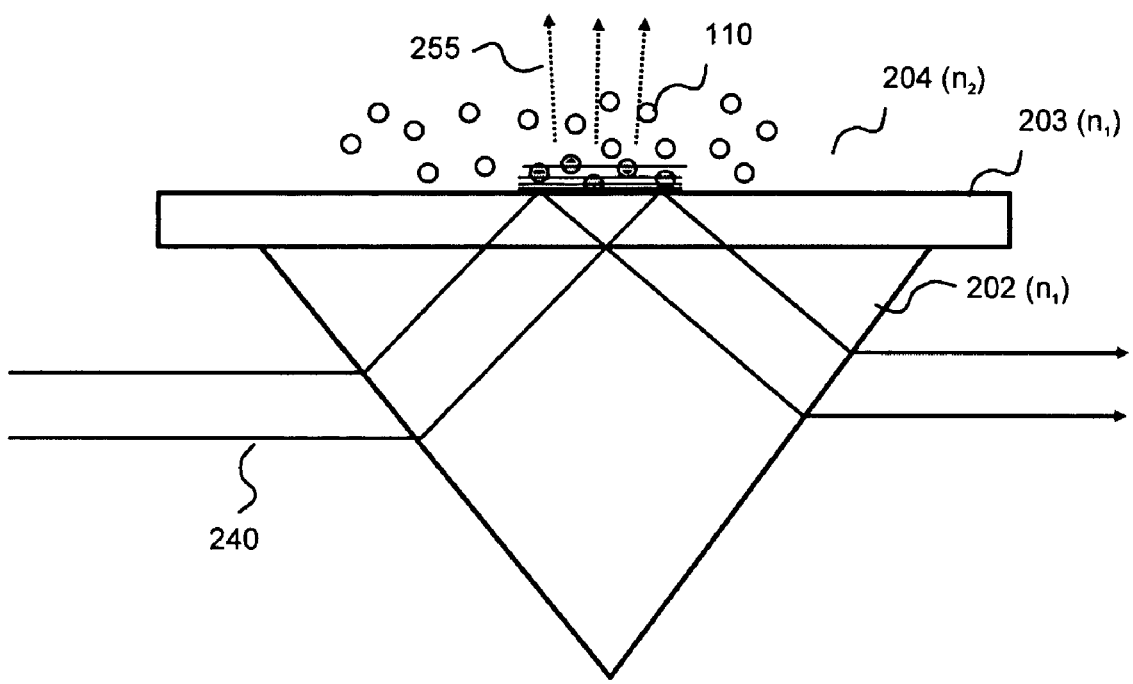
FIG. 6 illustrates the detailed construction of the fluorescence microscope of FIG. 5.

Hereinafter, embodiments of the present invention will be described in detail with reference to the attached drawings. Reference now should be made to the drawings, in which the same reference numerals are used throughout the different drawings to designate the same or similar components.

Figure 7:
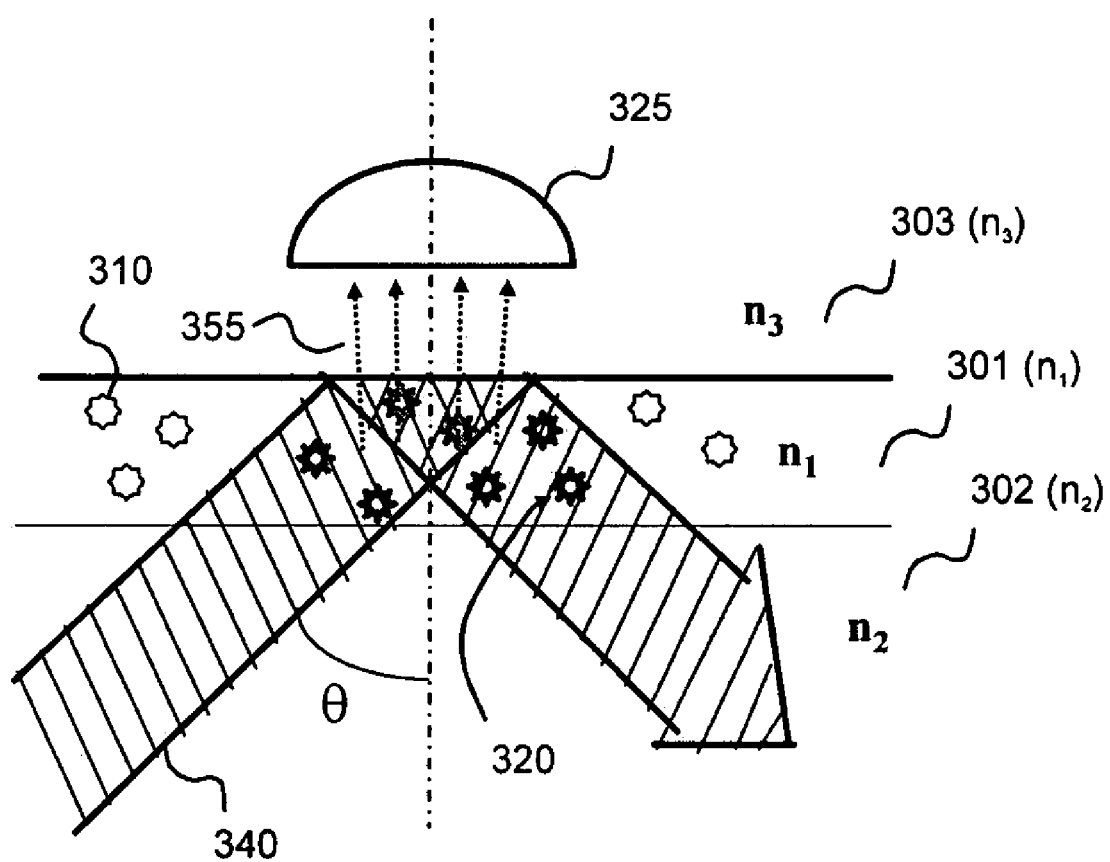
FIG. 7 illustrates the detailed construction of a fluorescence microscope according to an embodiment of the present invention.

FIG. 7 illustrates the detailed construction of a fluorescence microscope according to an embodiment of the present invention. As shown in FIG. 7, micro-objects (organic molecules, fibroid materials, deoxyribonucleic acid (DNA), chromosomes, cells, etc.), which are to be observed and include fluorophores, are included in a first medium 301 having a refractive index of $n_1$. A second medium 302 having a refractive index of $n_2$ is placed to be adjacent to one surface of the first medium 301 and to support the bottom of the first medium. The refractive index $n_2$ of the second medium 302 can be adjusted to be equal to or similar to the refractive index $n_1$ of the first medium 301, but it is not necessarily required. When the refractive indices are adjusted to be equal or similar, refraction of incident light hardly occurs at the interface between the first and second media 301 and 302, as shown in FIG. 7.

Another surface of the first medium is adjacent to a third medium 303 (generally, an air medium) having a refractive index of $n_3$ arranged between an objective lens 325 and the first medium 301. In this case, the refractive indices of respective media satisfy the following inequation, $$n_2 \approx n_1 > n_3$$

where the incident angle of light incident on the interface between the first and third media 301 and 303 must be equal to or greater than a critical reflection angle $\theta_c$. That is, the following relationship must be satisfied.

$$\theta > \theta_c = \sin^{-1}(n_3/n_1)$$

In this case, the light obliquely incident on the second medium 302 crosses the interface between the second and first media 302 and 301 without actually causing great variation in light direction, and is totally internally reflected from the interface between the first and third media 301 and 303. Therefore, fluorescence is emitted from the first medium 301 due to fluorophores present in micro-objects 320 existing in optical paths before and after the total internal reflection. The objective lens 325 collects the emitted fluorescence by irradiated light, and an optical processing unit, including a camera, etc., forms fluorescence images of samples.

Figure 8:
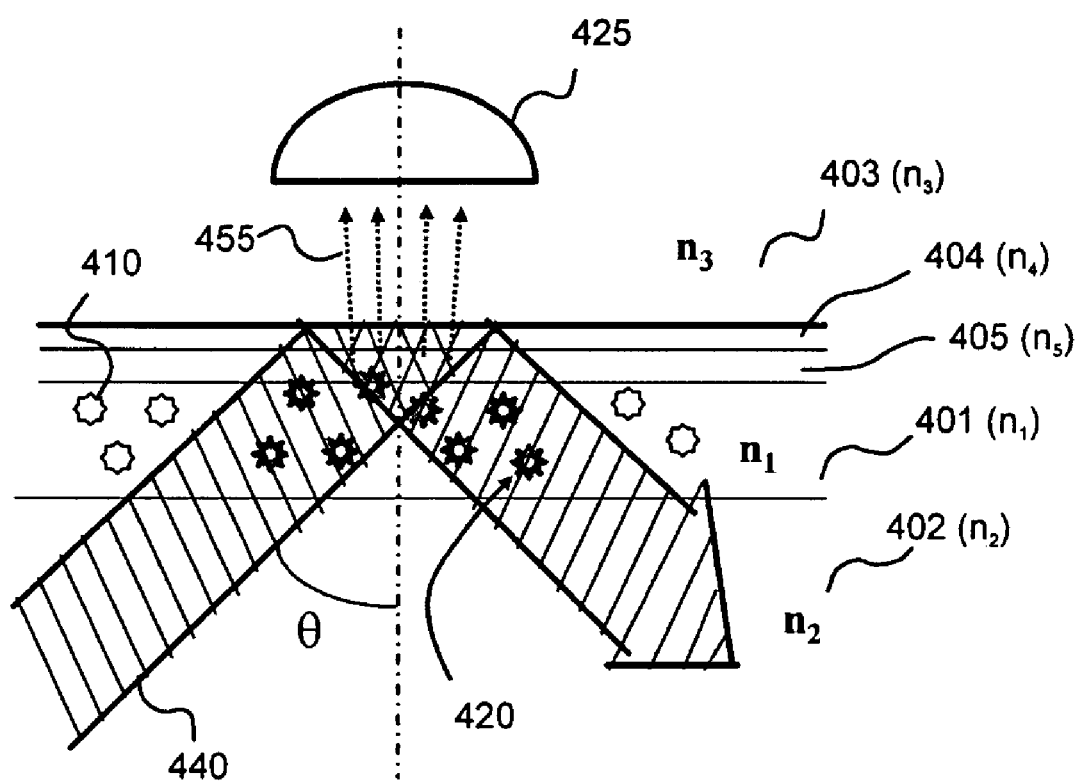
FIG. 8 illustrates the detailed construction of a fluorescence microscope according to another embodiment of the present invention.

If the surface of the first medium 301 forming the interface together with the third medium 303 is not sufficiently level and smooth, leakage of light may occur at the interface between the first and third media 301 and 303 due to the refraction and scattering of excitation light on the surface of the first medium 301. The leaked light, which is undesirable stray light, is incident on the objective lens to decrease the contrast of a fluorescence image, and forms a pseudo image, which is not generated due to the fluorescence from the actual micro-objects. In order to reduce the probability of the occurrence of leaked light, an immersion medium (optical coupling fluid) layer 405 (having a refractive index of $n_5$) may be applied to the top surface of a first medium 401, and a cover glass 404 having a refractive index of $n_4$ may cover the top of the optical coupling fluid layer 405, as shown in FIG. 8.

In this case, the refractive index $n_5$ of the optical coupling fluid layer 405 and the refractive index $n_4$ of the cover glass 404 are set to be the same or approximate to each other, thus enabling the optical coupling fluid layer 405 and the cover glass 404 to have the same optical characteristics. That is, the media can be set to satisfy $n_1 \approx n_2 \approx n_4 \approx n_5$.

Figure 9:
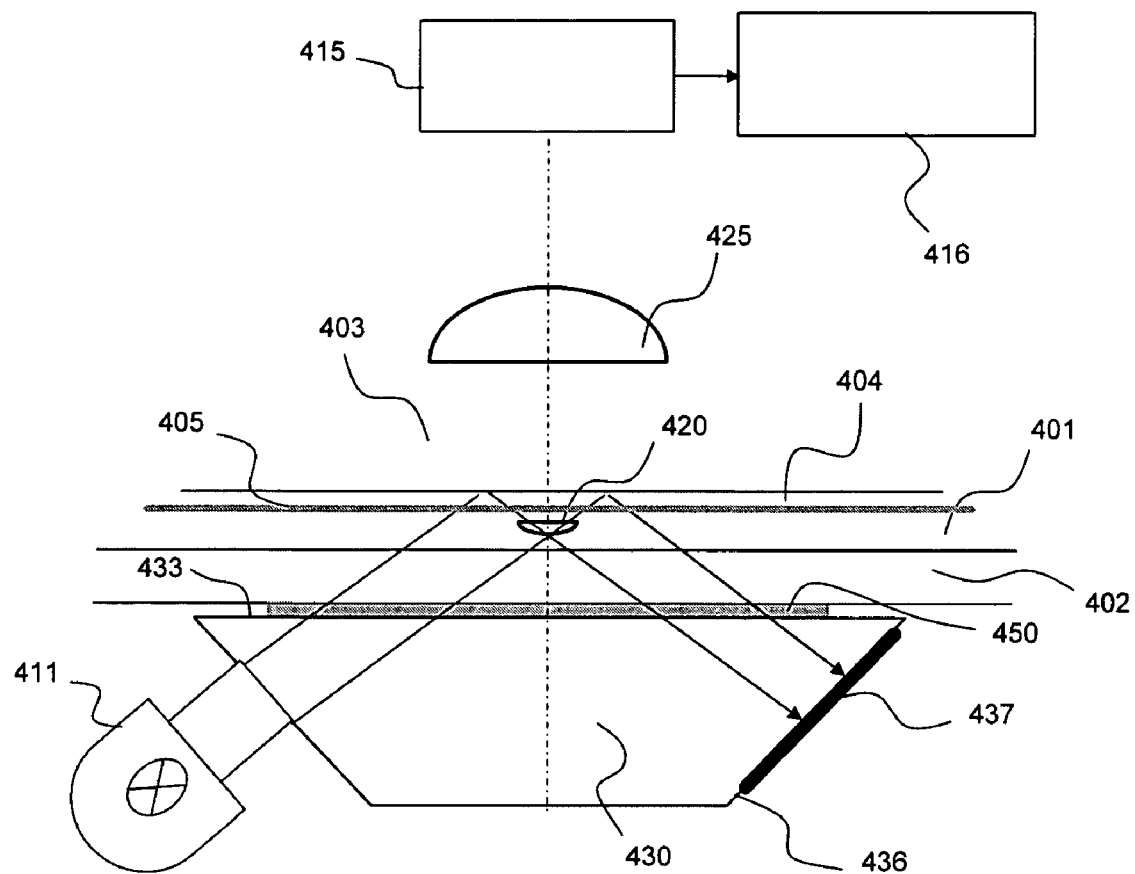
FIG. 9 illustrates the entire construction of a fluorescence microscope according to an embodiment of the present invention.

FIG. 9 illustrates the entire construction of a fluorescence microscope according to an embodiment of the present invention. The fluorescence microscope according to the embodiment of the present invention provides excitation light to a sample using a light source 411 and a prism 430. On the interface between the upper surface 433 of the prism 430 and a slide 402, an optical coupling material layer 450 to adjust refractive indices and smoothly and optically couple the prism 430 to the slide 402 is formed. On another surface 436 of the prism 430, an optical absorber 437 is placed to reduce the reverse reflection of excitation light that has been totally reflected.

A micro-object 420 needing to be observed by the microscope is placed in a first medium 401 on the slide 402, and is lightly covered by the cover glass 404. The bottom of the cover glass 404 is in contact with the first medium 401 through an optical coupling fluid 405, such as immersion oil. The function of the optical coupling fluid 405 is to fill uneven portions, such as micro-irregularities on the surface of the sample, and adjust the refractive indices of the media coming into contact with each other. The top surface of the cover glass 404 is spaced apart from the foremost lens of the objective lens 425 with an air medium 403 being interposed between the cover glass 404 and the objective lens 425.

The refractive indices of the first medium 401, the slide 402, which is the second medium, the optical coupling material layer 450 and the prism 430 are preferably selected to be the same. The incident angle of excitation light incident on the interface between the cover glass 404, which is the fourth medium, and the air 403, which is the third medium, must be greater than a critical incident angle. The incident light and reflected light that are totally internally reflected from the interface between the third medium 403 and the cover glass 404 are partially absorbed by fluorescent molecules in the micro-object 420 to emit fluorescence while passing through the micro-object 420. In this case, fluorophores can be excited over an entire thickness of the sample, so that the excitation of fluorophores occurs over an entire space through which the excitation light passes, not a partial region such as the surface of the sample.

The fluorescence emitted from the micro-object is collected by the objective lens 425 to form an image, which is applied to an image reception unit 415 including a CCD camera, etc. The image reception unit 415 is connected to an image processing unit 416 that is connected to a recording apparatus to store, process and analyze a TV screen through image processing and analysis.

Light reflected from the interface between the third medium 403 and the cover glass 404 is absorbed by the optical absorber 437 installed on one side of the prism so as to suppress the occurrence of optical noise.

The fluorescence microscope of the present invention does not use excitation and shielding optical filters that are generally used in conventional fluorescence microscopes, thus removing the attenuation of the intensity of the excitation light spectrum. Further, the fluorescence microscope of the present invention does not include optical components, such as a filter for selecting an optical spectrum, in the path of the fluorescence emission including the objective lens, but uses white light as a light source, i.e. non-coherent light, and uses a color CCD camera for a reception unit, thereby executing processing, such as the transformation of color image signals, in the form of an image. Further, since the fluorescence microscope of the present invention exploits a multi-wavelength viewer, it can simultaneously observe and record fluorescence images emitted from various fluorophores. In the construction according to this embodiment, suitable excitation wavelength is automatically selected from the light source in order for respective fluorophores to perform optimal excitation, and individual fluorescence images can be formed through their fluorescent spectra by the multi-wavelength viewer.

Further, optical coupling material 450 made of an elastic material achieving smooth contact even in a dry state can be used between the prism 430 and the slide 402. Therefore, an operation of applying immersion oil thinly or an operation of eliminating the immersion oil when the slide 402 comes into contact with the prism 430 is not required, thus increasing operating convenience.

Hereinafter, after the fluorescence microscope according to the embodiment of the present invention is actually implemented, the results of the actual observation of micro-objects using the fluorescence microscope are exemplified. For a light source, a light source system composed of a short wavelength arc mercury lamp (model name: DRSha-250-3M) having 250 watts of power and a quartz optical fiber having a numerical aperture of 0.36, or a semiconductor laser (model name: VM 65014, 655 H M, 25 mW, maker: MIDWEST LASER PRODUCTS) was used. A Macrozoom 1:5 lens used for Macroscope M-420 by WILD HEERBRUGG was used as an objective lens. A prism was made of a glass material having a refractive index of 1.51 and a vertical angle of 90 degrees. The upper surface of the prism was covered by an elastic plastic material functioning as the above-described optical covering material 450. OTV-S6 (Olympus), which is a color CCD system, or "Photometrics CoolSNAP (Roper Scientific, GmbH)", which is a monochromatic high sensitive CCD camera system, was used as an image reception unit. Images obtained by the image reception unit are digitally processed or analyzed on a screen through a frame grabber FG/PCI-2, and then mapped on a computer monitor. Excitation and shielding filters were not used on an optical path for irradiating excitation light and an optical path for receiving fluorescence.

The observation was carried out using various sample arrangement methods and objects. A sample was observed with respect to a case a) where the sample is placed to allow its surface to directly comes into contact with an air medium (that is, the case of FIG. 7), and a case b) where the sample is placed to allow its surface to be lightly covered by a cover glass through immersion oil (that is, the case of FIG. 8).

Figure 10:
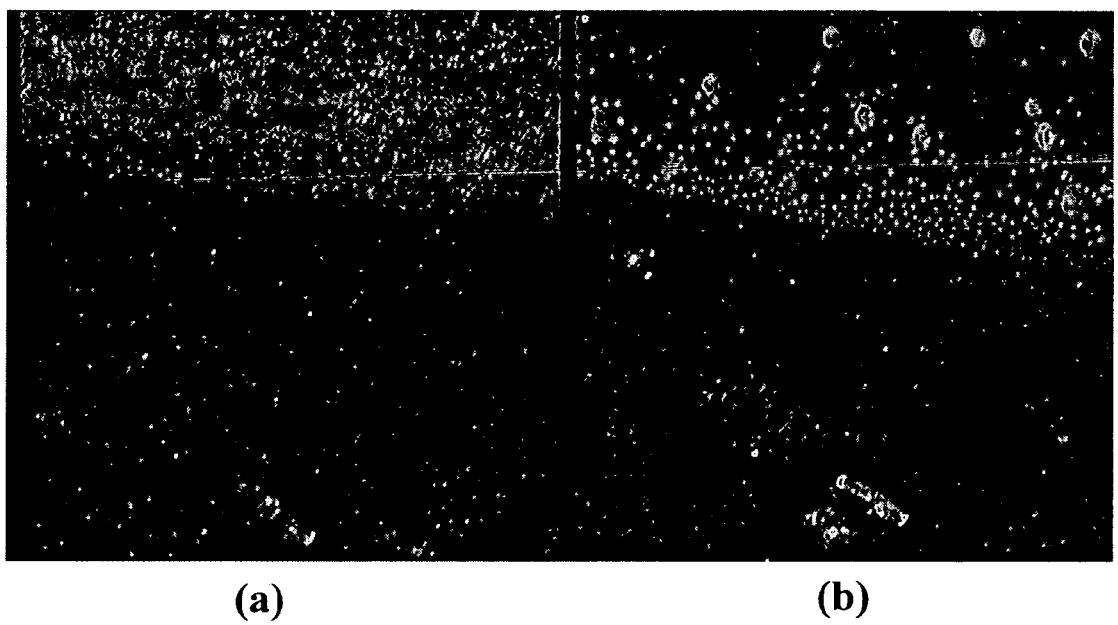
FIGS. 10a and 10b illustrate examples of an image observed by the fluorescence microscope according to the embodiment of the present invention.

Application Example 1:

Images, directly expressed on the surface of the prism in the form of lines using red and green fluorescent dyes similar to polychromatic fluorescent samples which are objects to be researched, are shown in FIGS. 10a and 10b. Light was irradiated using a white light source, i.e. non-coherent light, through an optical fiber, and an optical filter was not used. FIGS. 10a and 10b illustrate images recorded using a color camera OTV-S6 in the case where a cover glass was not used (left screen), and in the case where a cover glass was used (right screen), respectively. Through the above results, it can be seen that the fluorescence microscope proposed in the present invention can be used to simultaneously observe and record fluorophores having various colors.

Application Example 2:

An oligonucleotide microchip used to diagnose a tubercle bacillus having tolerance to an antibiotic for tuberculosis treatment was observed using the fluorescence microscope of the present invention. The microchip is composed of 50 cells, each having a diameter of approximately 100 μm, and was formed on gel placed on a microscope slide. In each cell, molecules formed through DNA hybridization having various oligonucleotides were placed, and fluorescent labels were attached to the cells.

Figure 11:
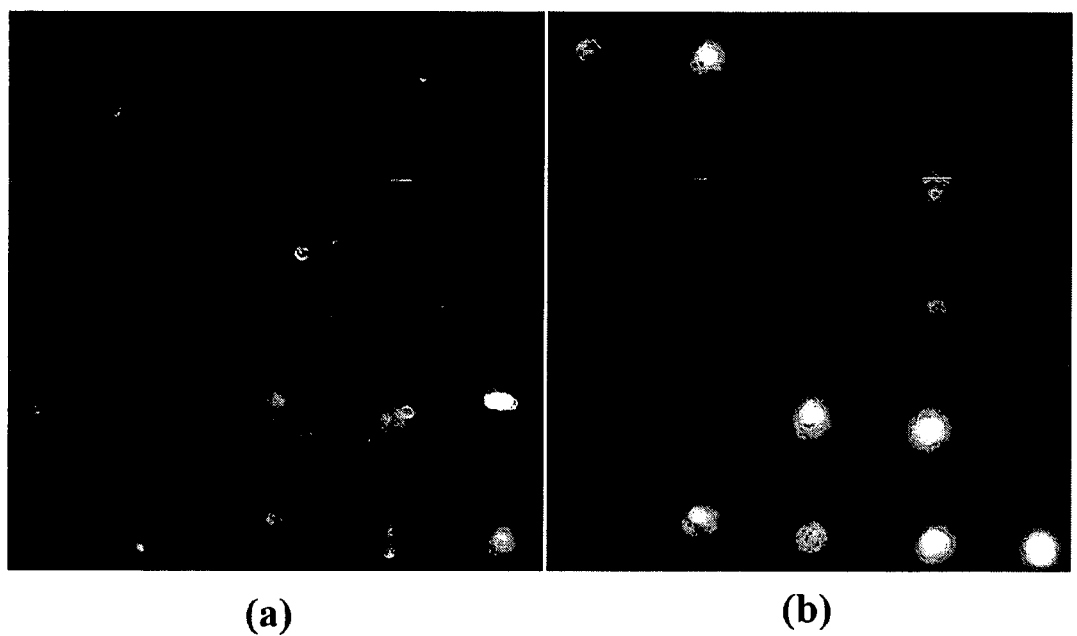
FIGS. 11a and 11b illustrate other examples of an image observed by the fluorescence microscope according to the embodiment of the present invention.

The fluorescent brightness of each cell depends on the components of nucleotide immobilized to the cell. Dye cy5 was used as a fluorescent marker, and semiconductor laser VM 65014 was used for excitation light. For the reception of fluorescence, Photometrics CoolSNAP, which is a high sensitive monochromatic camera, was used. FIGS. 11a and 11b illustrate observation results in the case where a cover glass was not used (that is, the case of FIG. 7, left screen) and in the case where a cover glass was used (that is, the case of FIG. 8, right screen), respectively.

By the scheme proposed in the present invention, the observation of the fluorescence of a biological microchip is possible without the installation of optical filters on excitation and reception light paths. The case where a cover glass was used to eliminate optical noise occurring due to defects, such as micro-irregularities on the surface of the gel had excellent fluorescent quality.

As described above, the present invention provides a fluorescence microscope and method of observing samples using the microscope, which can reduce optical noise and obtain more highly sensitive images, thus obtaining precise information about the density, quantity, location, etc. of a fluorophore, and which can simultaneously process separate images even when a plurality of fluorophores having different excitation and fluorescent wavelength ranges is distributed, thus easily obtaining pieces of information about the fluorophores at a time. Further, the present invention is advantageous in that, if the fluorescence microscope of the present invention is used, excitation and shielding optical filters, which were generally used in conventional fluorescence microscopes, are not used, so that the attenuation of the intensity of the excitation light spectrum does not occur, thus further increasing sensitivity and further simplifying the microscope.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the present invention is not limited to the above embodiments and drawings, but should be appreciated to include scopes equivalent to claims, which will be described later, as well as the claims.

What is claimed is:

1. A fluorescence microscope, comprising:
   an objective lens;

a first medium unit with a refractive index of $n_1$ for accommodating one or more micro-objects including a plurality of fluorophores with different excitation and/or fluorescence wavelength ranges and providing a path of white light as excitation light to excite the fluorophores;

a third medium unit with a refractive index of $n_3$ placed between the first medium unit and the objective lens to totally reflect the excitation light incident through the first medium unit at an interface of the third medium unit coming into contact with the first medium unit;

an image processing unit for providing images of objects obtained due to fluorescence collected by the objective lens as images;

a prism including at least an incident surface, a contact surface and an output surface;

a light source for providing excitation light to the incident surface of the prism;

an optical coupling unit formed on the contact surface of the prism so as to allow a sample including one or more micro-objects having fluorophores to be seated thereon; and an absorber installed on the output surface of the prism to absorb the excitation light that has been totally reflected, wherein the refractive indices of the third and first medium units satisfy a relationship of $n_1 > n_3$, wherein an incident angle of the excitation light on the interface is equal to or greater than a critical angle, and wherein fluorescences, emitted when fluorophores present in micro-objects that exist in the path of the excitation light within the first medium unit are excited, are captured by the objective lens, thus observing the micro-objects.

2. A fluorescence microscope, comprising:

an objective lens;

a first medium unit with a refractive index of $n_1$ for accommodating one or more micro-objects including a plurality of fluorophores with different excitation and/or fluorescence wavelength ranges and providing a path of white light as excitation light to excite the fluorophores;

a fourth medium unit with a refractive index of $n_4$ for covering a surface facing the objective lens among surfaces of the first medium unit;

a third medium unit with a refractive index of $n_3$ placed between the fourth medium unit and the objective lens to totally reflect the excitation light incident through the first and fourth medium units at an interface of the third medium unit coming into contact with the fourth medium unit;

an image processing unit for providing images of objects obtained due to fluorescence collected by the objective lens as images;

a prism including at least an incident surface, a contact surface and an output surface;

a light source for providing excitation light to the incident surface of the prism;

an optical coupling unit formed on the contact surface of the prism so as to allow a sample including one or more micro-objects having fluorophores to be seated thereon; and an absorber installed on the output surface of the prism to absorb the excitation light that has been totally reflected, wherein the refractive indices of the first, third and fourth medium units satisfy a relationship of $n_1 \approx n_4 > n_3$, wherein an incident angle of the excitation light on the interface between the fourth and third medium units is equal to or greater than a critical angle, and wherein fluorescences, emitted when fluorophores present in micro-objects that exist in the path of the excitation light within the first medium unit are excited, are captured by the objective lens, thus observing the micro-objects.

3. The fluorescence microscope according to claim 2, further comprising an optical coupling fluid layer for optically coupling the fourth and first medium units to each other as a fifth medium unit, the fourth medium unit being a cover glass, wherein the fifth medium unit has a refractive index of $n_5$, and satisfies a relationship of $n_5 \approx n_4 \approx n_1$.

4. The fluorescence microscope according to any of claims 1 to 3, wherein the optical coupling unit is made of an elastic material to facilitate optical contact with the seated sample.

\* \* \* \* \*